United States Patent [19]

Abraham

[11] Patent Number: 5,266,653
[45] Date of Patent: Nov. 30, 1993

[54] HIGHLY HYDROGENATED FUNCTIONAL-TERMINATED CONJUGATED DIENE POLYMERS

[75] Inventor: Tonson Abraham, Elyria, Ohio

[73] Assignee: The B. F. Goodrich Company, Akron, Ohio

[21] Appl. No.: 710,622

[22] Filed: Jun. 5, 1991

[51] Int. Cl.$^5$ ............................................. C08F 8/04
[52] U.S. Cl. ................................. 525/338; 525/328.8; 525/329.7; 525/331.7; 525/332.8; 525/332.9; 525/333.1; 525/333.2; 525/339; 525/355; 525/366; 525/369
[58] Field of Search ............... 525/338, 339, 366, 369, 525/355

[56] References Cited

U.S. PATENT DOCUMENTS 4,866,120  9/1989  Rudnick et al. .

FOREIGN PATENT DOCUMENTS

| 0360356 | 3/1990 | European Pat. Off. . |
| 51-061593 | 5/1976 | Japan . |
| 53-026890 | 3/1978 | Japan . |
| 62-151404 | 7/1987 | Japan . |
| 62-151405 | 7/1987 | Japan . |
| 62-218410 | 9/1987 | Japan . |
| 63-027521 | 2/1988 | Japan . |
| 63-057626 | 3/1988 | Japan . |
| 01289806 | 11/1989 | Japan . |
| 8808856 | 11/1988 | World Int. Prop. O. . |

OTHER PUBLICATIONS

An article entitled "The Hydrogenation of HO-Terminated Telechelic Polybutadienes in the Presence of a Homogeneous Hydrogenation Catalyst Based on Tris(-triphenylphosphine)rhodium Chloride", by Karel Bouchal, Michal Ilavsky, and Eva Zurkova, Institute of Macromolecular Chemistry 165 (1989) 165-180 (Nr. 7216), Czechoslovak Academy of Sciences.

Makromol. Chem. 180, 2309-2321 (1979) Synthese et proprietes d'oligomeres dieniques partielement et totalement hydrogenes.

Encyclopedia of Polymer Science and Engineering, vol. 7, Fibers, Optical to Hydrogenation, a Wiley-Interscience Publication, John Wiley & Sons.

Primary Examiner—Bernard Lipman
Attorney, Agent, or Firm—Hudak & Shunk Co., LPA

[57] ABSTRACT

Poisoning or deactivation of conventional homogeneous catalysts to be used in hydrogenation of the backbone unsaturation in liquid monofunctional and difunctional-terminated conjugated diene polymers, is prevented by reacting a blocking agent compound with the functional end groups present in these polymers. More specifically, subsequent to formation of a selected starting material monofunctional or difunctional-terminated conjugated diene polymer, a suitable blocking agent is reacted with the functional end groups of the polymer enabling relatively inexpensive titanium, iron, cobalt, or nickel-based homogeneous catalysts to be used in hydrogenating the backbone unsaturation of the polymer to a high degree. Subsequent to hydrogenation, the polymer is subjected to conventional hydrolysis using a mineral acid or base to remove the blocking groups and return the hydrogenated conjugated diene polymer to its original functionality.

34 Claims, 6 Drawing Sheets

PMR SPECTRUM
DIHYDROXY TERMINATED POLYBUTADIENE
REFERENCE: TETRAMETHYLSILANE (0.00 PPM)

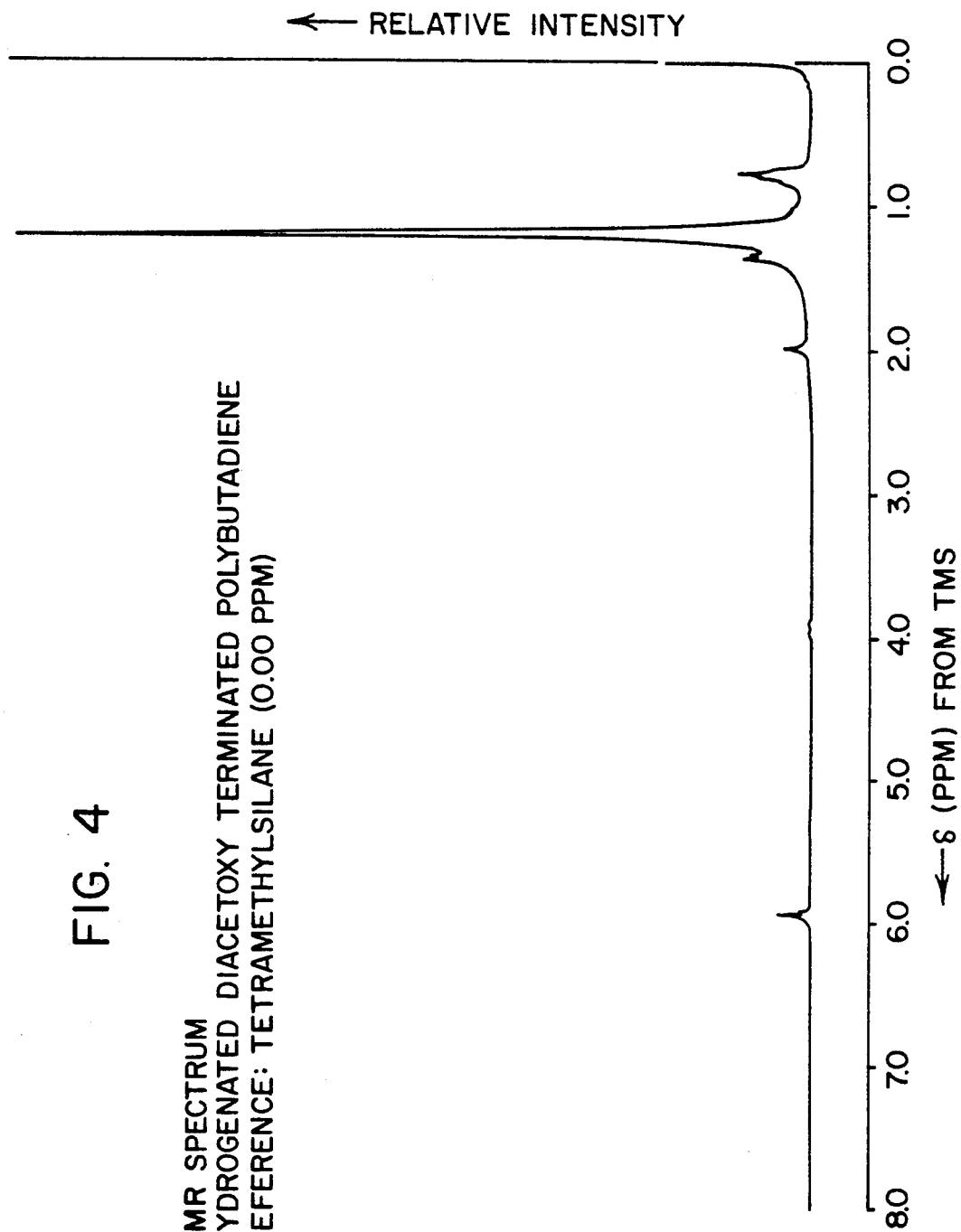

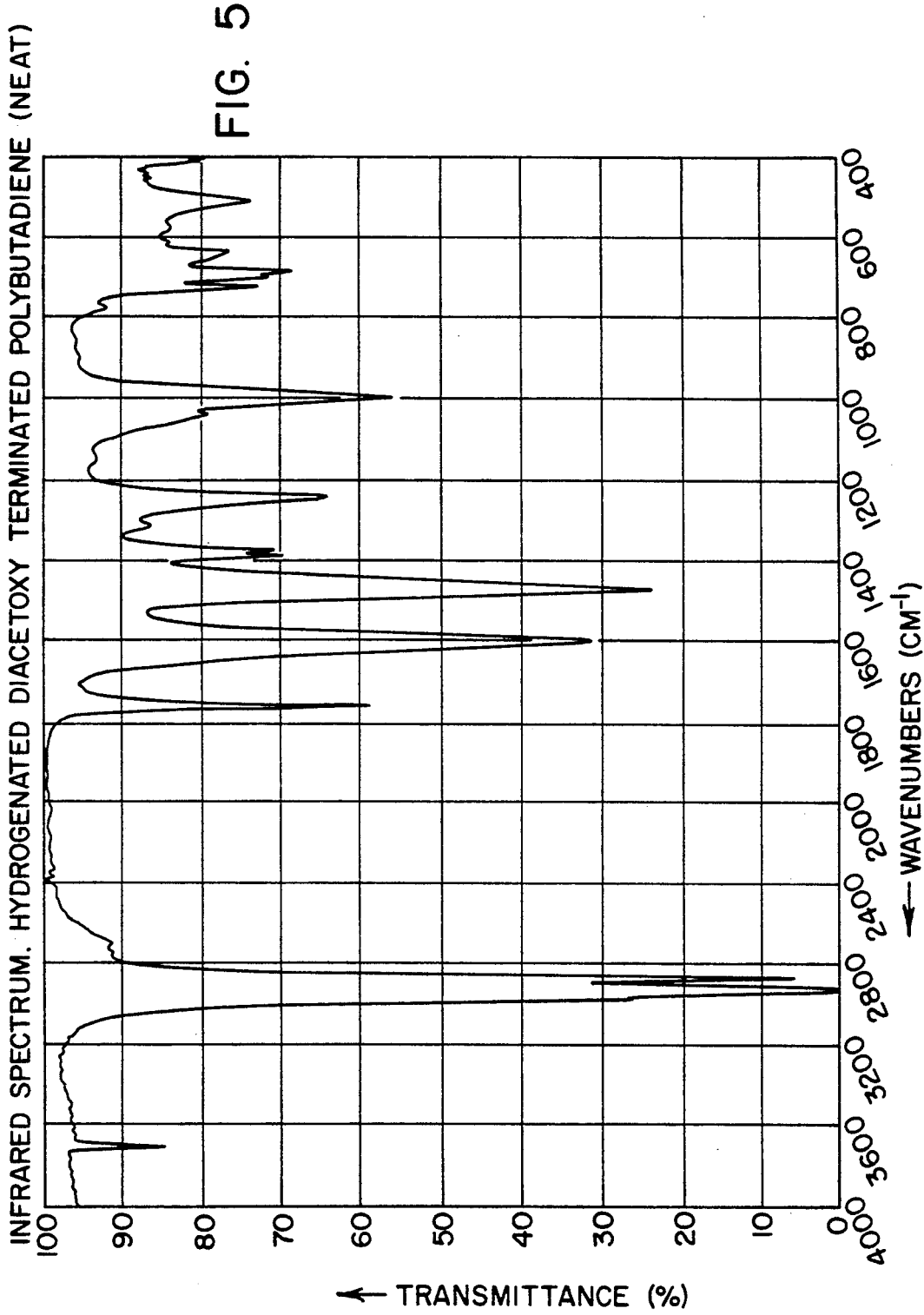

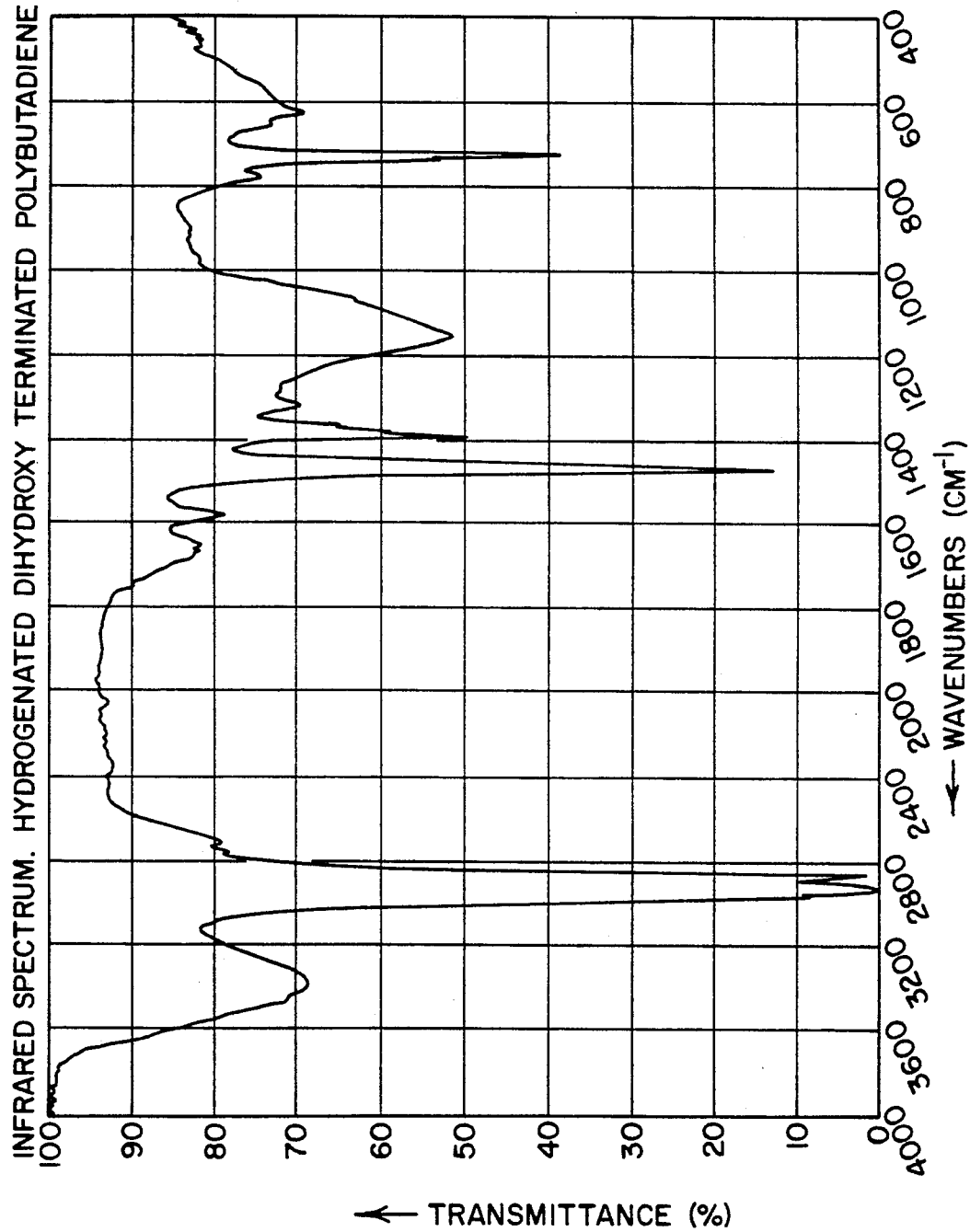

HIGHLY HYDROGENATED FUNCTIONAL-TERMINATED CONJUGATED DIENE POLYMERS

FIELD OF THE INVENTION

The invention relates to highly hydrogenated functional-terminated conjugated diene polymers, and in particular to liquid monofunctional and difunctional-terminated conjugated diene polymers which are hydrogenated to a high degree using conventional, relatively inexpensive homogeneous catalysts.

BACKGROUND

Monofunctional and difunctional-terminated liquid homopolymers derived from butadiene and isoprene monomers are suitable for a variety of applications in the polymer industry, and are particularly desirable due to their relatively low cost. However, the presence of unsaturation in the aliphatic hydrocarbon backbones of these monomers render the polymers produced therefrom thermooxidatively unstable. That is, such polymers are susceptible to breakdown through oxidation catalyzed by heat. However, by hydrogenating the unsaturation present in these polymers to a high degree, the thermooxidative stability of the polymers can be substantially improved. More particularly, removal of at least about 95 percent of the unsaturation in monofunctional and difunctional-terminated polybutadiene or polyisoprene significantly improves their thermooxidative stability, and saturation of at least about 99 percent of the backbone double bonds results in a polymer having superior thermooxidative stability.

Catalytic hydrogenation is a conventional way of obtaining saturated materials from monofunctional and difunctional-terminated conjugated diene polymers. However, cost-effective heterogeneous catalysts, such as Raney nickel, which are suitable for the hydrogenation of most monomers are, in general, unsuitable for hydrogenation of monofunctional and difunctional-terminated conjugated diene polymers to a high degree, presumably due to the inaccessibility of the polymer backbone to the catalyst. This inaccessibility is due to the coiled conformation that these polymers assume. In some instances, specially prepared heterogeneous noble metal catalysts with a high surface area, such as rhodium and palladium-based heterogeneous catalysts, have been shown to be successful in such an application, but are not cost-effective due to their inherent high cost as well as increased expense related to the special preparation of these catalysts. As alluded to above, in order for a hydrogenation catalyst to be effective, intimate contact between the catalyst and the polymer backbone is necessary. Hence, preferred catalysts for the hydrogenation of these polymers are homogeneous rather than heterogeneous, since such homogeneous catalysts achieve this intimate contact.

Rhodium and palladium-based homogeneous catalysts, and in particular tristriphenylphosphinerhodium (I) chloride, have heretofore been the catalysts of choice for hydrogenating functional-terminated conjugated diene polymers. These catalysts are chosen because they achieve intimate contact with the polymer backbone and further because they are unaffected by the functional groups of the polymers, resulting in a high degree of hydrogenation of the unsaturated polymer backbone. However, rhodium and palladium-based homogeneous catalysts are very expensive. Although more conventional homogeneous catalysts based on titanium, iron, cobalt, or nickel are generally about 1,000 times less expensive than the rhodium or palladium-based homogeneous catalysts, these conventional homogeneous catalysts are easily deactivated or "poisoned" in the presence of certain functional groups in the polymer being hydrogenated. For example, a cobalt-based homogeneous catalyst would undergo oxidative addition with the terminal hydroxy groups of a monofunctional or difunctional hydroxy-terminated polybutadiene polymer, thereby causing chain extension and subsequent gelation of a solution of the polymer, thus making the polymer unsuitable for hydrogenation. Aluminum trialkyls, which are commonly used reductants in the formation of active cobalt species, would also exert a similar effect on the polymer.

Japanese patent 62151404 relates to hydroxy-containing diene polymers which are catalytically hydrogenated in solvents, then treated with alcohols to separate highly-hydrogenated polymers from low or non-hydrogenated polymers. Thus, 300 g of OH-terminated polyisoprene was hydrogenated over Ni-diatomaceous earth in hexane at 130° and 50 kg/cm$^2$-gage H for 4 hours, then shaken with 400 cm$^3$ iso-PrOH and left to stand to separate into two layers, the top of which contained 103 g of 97 percent hydrogenated polymer and the bottom of which contained 200 g of 56 percent hydrogenated polymer.

Japanese Patent 62151405 relates to OH-terminated diene polymers which are catalytically hydrogenated in high yield by solution hydrogenation, treatment with alcohols, and rehydrogenation of the resulting dark solution. Thus, 300 g of OH-terminated polyisoprene was hydrogenated in n-hexane with a Ni-kieselguhr catalyst and the solution treated with 400 g of 2-propanol to form transparent (hydrogenated to 97 percent) and dark-colored (hydrogenated to 56 percent) fractions. The colored fraction was rehydrogenated to obtain a hydrogenation ratio of 67 percent.

Japanese Patent 53026890 relates to using Raney Ni catalysts, to hydrogenate OH-containing unsaturated hydrocarbon polymers in alcohols or mixtures of alcohols and other organic solvents. Thus, 50 g of polybutadiene polyol (having a number average molecular weight of 3100 and an OH value of 0.82 mequiv./g) 50 g of iso-PrOH, and 5 g of Raney Ni catalyst were hydrogenated for 6 hours at 150° and 50 kg/cm$^2$ H pressure in an autoclave to give 50 parts polymer (having 0.83 mequiv./g OH value). The hydrogenation degree was 63.8 percent, as compared with 19.5 percent when cyclohexane was used instead of iso-PrOH.

SUMMARY OF THE INVENTION

Objects of the present invention include the formation of highly hydrogenated thermooxidatively stable liquid monofunctional and difunctional-terminated conjugated diene polymers utilizing conventional, relatively inexpensive homogeneous catalysts.

These objects are obtained by the process of the present invention for hydrogenating backbone unsaturation of a polymer having functional end groups, the process including the steps of reacting a sufficient amount of a blocking agent with the functional end groups for blocking the functionality of the end groups, hydrogenating at least about 80 percent of the backbone unsaturation of the polymer in the presence of a sufficient amount of a noble metal-free homogeneous catalyst, the blocking agent preventing deactivation of the catalyst by the functional end groups, and hydrolyzing the hydrogenated polymer with a sufficient amount of a hydrolyzing compound for unblocking the end groups and returning the polymer to its original functionality.

BRIEF DESCRIPTION OF THE DRAWINGS

FIG. 4 is a graph of the proton magnetic resonance spectrum of the difunctional acetoxy-terminated butadiene polymer of FIG. 2 after hydrogenation;

FIG. 5 is a graph of the infrared spectrum of the hydrogenated polymer of FIG. 4; and FIG. 6 is a graph of the infrared spectrum of the hydrogenated difunctional hydroxy-terminated polybutadiene product of the present invention formed by hydrolyzing the polymer of FIG. 4.

DESCRIPTION OF THE PREFERRED EMBODIMENT

Figure 1:
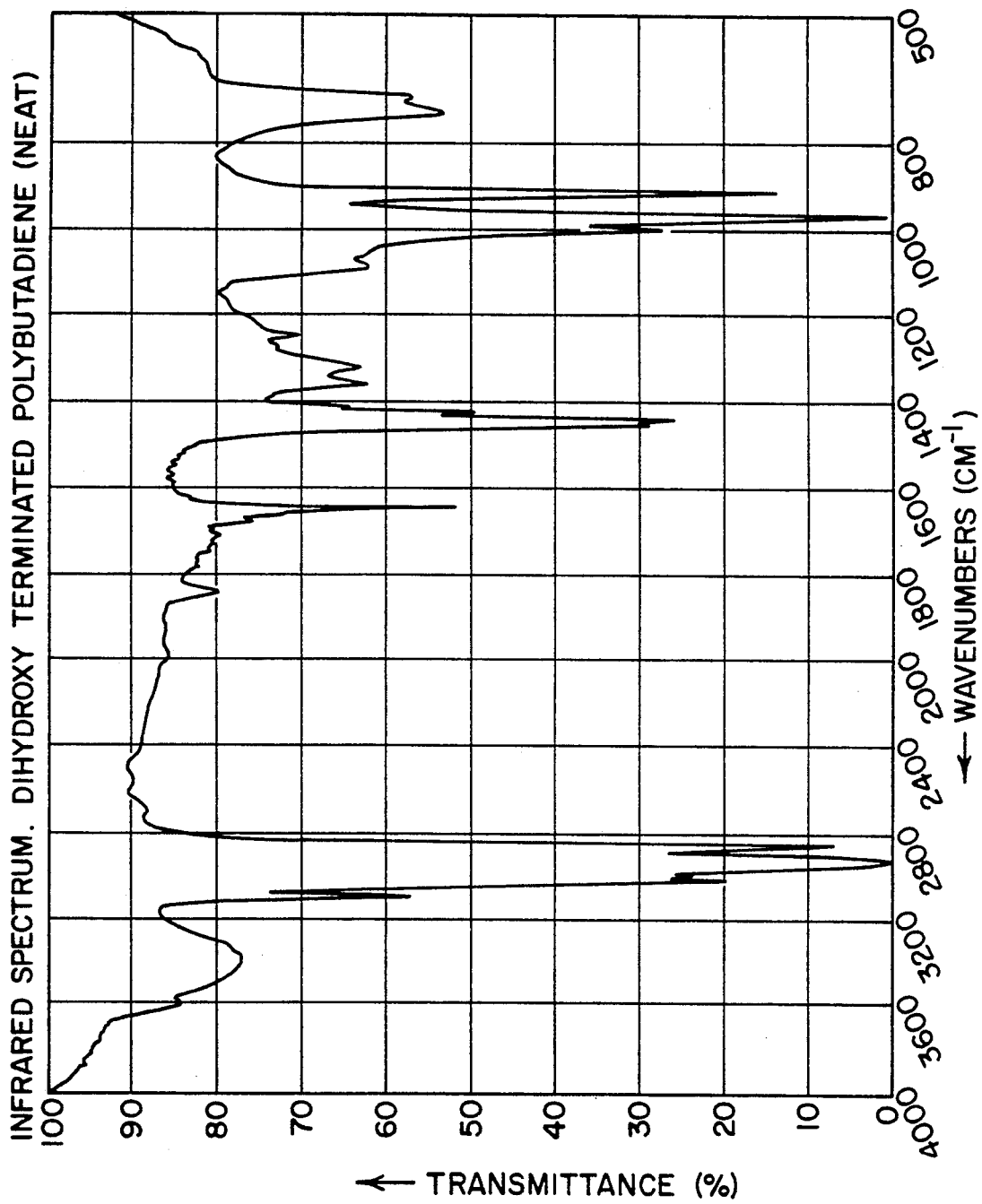
FIG. 1 is a graph of the infrared spectrum for a sample of liquid difunctional hydroxy-terminated polybutadiene starting material utilized in the present invention.

The present invention is directed to the hydrogenation of liquid monofunctional and difunctional-terminated conjugated diene polymers to a high degree utilizing relatively inexpensive conventional homogeneous catalysts based on titanium, iron, cobalt, or nickel. This is accomplished by masking or blocking the functional end groups of the unsaturated conjugated diene polymer using a suitable masking group or blocking agent in order to prevent deactivation or "poisoning" of the hydrogenation catalyst by those groups, and then hydrogenating the backbone unsaturation in these polymers over the selected catalyst in a normal fashion. Subsequent hydrolysis of the blocked end groups returns the polymer to its original functionality.

The starting material monofunctional and difunctional-terminated conjugated diene polymers utilized in the present invention are formed from conjugated diene monomers having 4 to 8 carbon atoms, with monomers having 4 or 5 carbon atoms being preferred, that is, butadiene and isoprene, respectively. The butadiene or isoprene polymers preferably are hydroxy-terminated, carboxyl-terminated, carboxamide-terminated, or imidazole-terminated.

The starting material difunctional-terminated conjugated diene polymers are prepared in the following manner. With regard to the difunctional hydroxy-terminated butadiene or isoprene polymers, formation is accomplished by preparing liquid polymerization products of butadiene or isoprene in a particular solvent which has a low chain transfer potential, namely tertiary butanol or acetone, and employing a peroxide initiator, with hydrogen peroxide being preferred and having the following structural formula:

No dithio modifiers are required in the preparation of the difunctional-terminated conjugated diene polymers.

An important aspect in producing the difunctional-terminated polybutadienes and polyisoprenes is the selection of a solvent for the polymerization system that will have a very low chain transfer constant, as referred to above. The free radical-growing end of a vinyl polymer chain molecule bears an odd electron and is a center of high reactivity. It can add monomer molecules and attack the solvent, removing therefrom an atom such as hydrogen to satisfy the free valence. When this attack or chain transfer from the solvent occurs, the particular polymer chain end becomes hydrogen-terminated. Each monomer growing chain or macro radical has its own characteristic degree of chain transfer for each different solvent. For example, carbon tetrachloride, $CCl_4$, is a highly reactive transfer agent for styrene polymerization, but is inferior to ketones for vinyl chloride polymerization and has little effect on acrylic acid or acrylonitrile polymerization. The chain transfer potential of a given solvent for a given monomer system is not predictable. Thus, it was surprising to discover that tertiary butanol and acetone, among many alcoholic and non-alcoholic systems studied, each have an extremely low chain transfer potential for butadiene and isoprene monomer systems leading to the production of low molecular weight polybutadienes or polyisoprenes having functionality at each end of the polymer chain due to coupling of the growing polymer chains. More specifically, liquid polybutadienes and polyisoprenes having a molecular weight of from about 500 to about 20,000; desirably from about 2,000 to about 10,000; and preferably from about 3,000 to about 5,000, are produced when a catalyst such as peroxide or the like is employed as the polymerization initiator. It is important to note that initiators containing nitrile groups cannot be utilized in forming the difunctional-terminated polybutadiene or polyisoprene starting materials, since nitrile groups would be hydrogenated by the conventional homogeneous catalysts used in the present invention, resulting in undesirable cross-linking reactions between the polymer chains and giving an unsuitable product.

When butadiene or isoprene monomers are polymerized in tertiary-butanol or acetone in the presence of an initiator such as peroxide at 70° to 80° C., and the polymerization is allowed to run until the initiator is about 75 percent decomposed as determined from its half-life at the particular temperature, excess butadiene or isoprene can be vented and the liquid polymer thrown down with methanol. After settling, the methanol tertiary butanol or methanol-acetone layer can be decanted. Inasmuch as the liquid difunctional-terminated isoprene polymers are well known to those of ordinary skill in the art, and have structures similar to those of the difunctional-terminated butadiene polymers represented by the formulas set forth in detail below, the structure of the isoprene polymers will not be set forth herein.

The hydrogen peroxide initiator, $H_2O_2$, utilized in forming the difunctional hydroxy-terminated polybutadiene and polyisoprene materials useful as starting materials in the present invention, decomposes to form the following free radicals:

which initiate polymerization to form the difunctional hydroxy-terminated conjugated diene polymer. The action of this type of an initiator is due to the fact that the oxygen-oxygen bond is readily dissociated, as by thermal means. The above process leads to difunctional-terminated conjugated diene polymers with excellent reproducibility and which are free from contamination by emulsifiers and salts.

The liquid difunctional hydroxy-terminated butadiene polymer may be represented by the following structure:

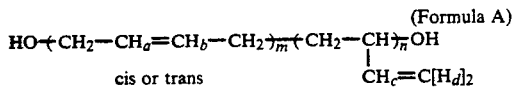

Hydroxy-Terminated Polybutadiene wherein n is from about 0 to about 90 weight percent, desirably from about 5 to about 15 percent, and preferably about 10 weight percent based on the total weight of m +n. Subscripts a, b, c, and d merely are identifiers for certain of the protons of the polymer, and will be useful in the examples set forth hereinbelow.

With regard to the difunctional carboxyl-terminated butadiene or isoprene polymers, formation is accomplished in a similar manner as described above for the difunctional hydroxy-terminated butadiene or isoprene polymers, except that an azo-bis acid initiator is employed, and preferably 2,2'-azobisisobutyric acid having the following structural formula:

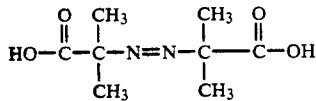

This initiator decomposes to form $N_2$ gas and the following free radicals:

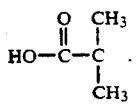

which initiate polymerization to form the difunctional carboxyl-terminated conjugated diene polymer. The action of this type of initiator is due to the fact that the tertiary carbon-nitrogen bond is readily dissociated, as by thermal means.

The liquid difunctional carboxyl-terminated butadiene polymer may be represented by the following structural formula:

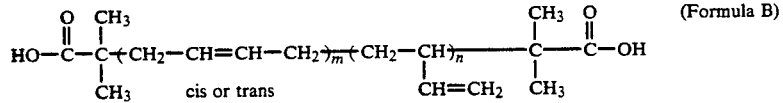

Carboxy-Terminated Polybutadiene

With regard to the difunctional carboxamide-terminated butadiene or isoprene polymers, formation is accomplished in a manner similar to that described above for the difunctional hydroxy and carboxyl-terminated conjugated diene polymers, except that an azo-bis amide initiator is used, and preferably 2,2' azo-bis(isobutyramide) having the following structural formula:

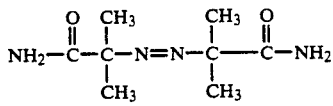

This initiator decomposes to form $N_2$ gas and the following free radicals:

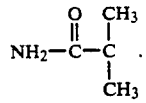

which initiate polymerization to form the difunctional carboxamide-terminated conjugated diene polymer. The action of this type of initiator is likely due to the fact that the tertiary carbon-nitrogen bond is readily dissociated, as by thermal means.

The liquid difunctional carboxamide-terminated butadiene polymer may be represented by the following structural formula:

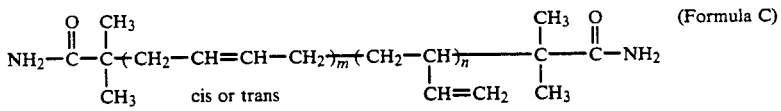

Carboxy-Terminated Polybutadiene

With regard to the difunctional imidazole-terminated butadiene or isoprene polymers, again, formation is accomplished in a manner similar to that described above for the difunctional hydroxy, carboxyl and carboxamide-terminated conjugated diene polymers, except that an azobis imidazole initiator is employed, such as 2,2'-azobis-2-(imidazol -2-yl)propane having the following structural formula:

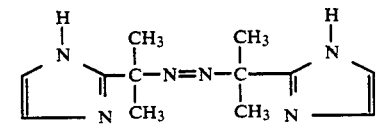

This initiator decomposes to form $N_2$ gas and the following free radicals:

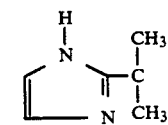

which initiate polymerization to form the difunctional imidazole-terminated conjugated diene polymer. The action of this type of initiator is also due to the fact that the tertiary carbon-nitrogen bond is readily dissociated, as by thermal means.

The liquid difunctional imidazole-terminated butadiene polymer may be represented by the following structural formula:

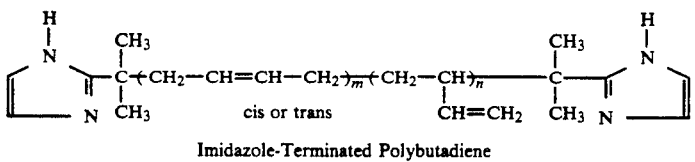

Imidazole-Terminated Polybutadiene

It is to be noted that the above embodiments of the liquid difunctional-terminated conjugated diene starting material polymers are preferably produced by the solution polymerization method. It is understood that difunctional-terminated conjugated diene copolymers formed from a conjugated diene monomer such as butadiene or isoprene and another non-polar monomer such as styrene can be utilized to form the starting materials, without affecting the overall concept of the present invention.

The alternative starting material, namely, statistical monofunctional-terminated conjugated diene polymers, are prepared in the following manner. It is to be understood that the term "statistical monofunctional" used for describing the alternative reactive liquid polymer starting material useful in the present invention, means that the polymer is regarded, statistically, as having 100 percent monofunctional end groups. However, the statistical monofunctional polymer may include difunctional, non-functional and monofunctional species, or alternatively, only difunctional and non-functional species, as will be described in greater detail below.

The alternative low viscosity statistical monofunctional reactive liquid polymer starting materials useful in the present invention are generally of two different types produced by two distinct processes. More particularly, the first type is a reaction product statistical monofunctional polymer composition, and the second type is a blended product statistical monofunctional polymer composition. With regard to the reaction product statistical monofunctional composition, the composition is the reaction product of various components such as a conjugated diene monomer and various initiators, and results in statistical monofunctional hydroxy, carboxyl, carboxamide, and imidazole-terminated reactive liquid polymers, depending, of course, on the initiator used. The resulting polymeric composition for each type of terminated polymer is actually a blend or a mixture of difunctional polymers, monofunctional polymers, and non-functional polymers, generally containing an average functionality per polymer of from about 0.2 to about 1.8, desirably from about 0.7 to about 1.3, and preferably approximately 1, and hence is referred to as a statistical monofunctional polymer. Considering the monofunctional-terminated reactive liquid polymer, it contains either a terminal hydroxy, carboxyl, carboxamide, or imidazole group at one end of the polymer chain, and a non-reactive or nonfunctional group at the other end of the polymer chain. Each terminus is derived from a fragment of the initiators used in the synthesis employed to make the polymers. When the particular polymer is a difunctional-terminated polymer, it will contain either a terminal hydroxy, carboxyl, carboxamide, or imidazole group at both ends of the polymer chain. When the polymer is a non-functional polymer, it will contain non-functional groups on each end of the polymer chain.

The reaction product statistical monofunctional carboxyl-terminated reactive polymer starting material used in the present invention is generally produced in the following manner.

The reaction product statistical monofunctional-terminated polymer can be generally indicated by the structural formula

wherein T—is the terminal group derived from the difunctional initiator and preferably is a hydroxy, carboxyl, carboxamide, or imidazole group depending on the polymerization initiator used,—Y is derived from the non-functional initiator and—PB—represents the preferred butadiene or isoprene backbone of the polymer, with the backbone monomers being polymerizable by any free radical reaction to form a butadiene or isoprene homopolymer. Generally, the difunctional-terminated polymer is represented by the structural formula

The statistical monofunctional-terminated polymers will contain generally a small or minority amount of such difunctional polymers, as well as non-functional polymers generally represented by the structural formula

wherein Y is derived from a non-functional initiator. The non-reactive terminus —Y of the molecule is referred to as such because it will not undergo condensation, as compared to the hydroxy, carboxyl, carboxamide, or imidazole termini, which will undergo that type of reaction. Although a solution polymerization process is preferred for forming the statistical monofunctional-terminated polymer starting material useful in the present invention, an emulsion polymerization process could be used without affecting the overall concept of the invention.

It is important to note that initiators containing nitrile groups cannot be utilized in forming the monofunctional-terminated polybutadiene or polyisoprene starting materials, for the same reason as discussed above with regard to the difunctional-terminated polybutadiene or polyisoprene starting materials. It is understood that monofunctional-terminated conjugated diene copolymers formed from a conjugated diene monomer such as butadiene or isoprene and another non-polar monomer such as styrene can be utilized to form the starting materials, also without affecting the overall concept of the present invention.

The blended product low viscosity statistical monofunctional reactive liquid polymer compositions useful as starting materials in the present invention are generally the blended product of a statistical difunctional hydroxy, carboxyl, carboxamide, or imidazole-terminated reactive liquid polymer and a non-functional polymer. Such blending of the statistical difunctional terminated reactive liquid polymers with a non-functional polymer results in a statistical monofunctional hydroxy, carboxyl, carboxamide, or imidazole-terminated reactive liquid rubber polymer, respectively. Thus, the blended product low viscosity statistical monofunctional reactive liquid polymer includes a blend of a difunctional-terminated polymer which contains either a terminal hydroxy, carboxyl, carboxamide, or imidazole group at both ends of the polymer chain, and a non-functional polymer which contains non-functional groups on each end of the polymer chain.

More specifically, the reaction product statistical monofunctional-terminated polymers which are hydroxy, carboxyl, carboxamide, or imidazole-terminated, each can be made by the polymerization process as set forth briefly immediately below. The polymerization process utilizes any conventional addition polymerization technique employing a free radical mechanism. Generally, the reaction is conducted by mixing the preferred butadiene or isoprene backbone-forming monomer with a mixture of a difunctional and non-functional initiator, and a solvent, then heating.

The initiator is a mixture or blend of two different initiators capable of initiating a free radical polymerization, namely a difunctional initiator such as those described above for the formation of the difunctional-terminated conjugated diene polymers terminated with a hydroxy, carboxyl, carboxamide, or imidazole group, and a nitrile group-free non-functional initiator such as those that are well known in the art and to the literature.

The amount of initiators present, on a mole basis, may vary from about 0.2 percent to about 90 percent difunctional initiator and from about 10 percent to about 99.8 percent non-functional initiator. Preferably from about 30 percent to about 75 percent difunctional initiator is used and from about 70 percent to about 25 percent non-functional initiator. Most preferred is from about 60 percent to about 40 percent difunctional initiator and from about 40 percent to about 60 percent nonfunctional initiator. As noted, one skilled in the art will appreciate that the monofunctional polymer starting material is a blend or mixture of molecules having different end groups, namely a monofunctional species, a difunctional species and a non-functional species. When the ideal 50/50 blend of difunctional and non-functional initiators is used, it is expected that, statistically, one obtains by weight, from about 5 percent to about 90 percent difunctional specie, from about 90 percent to about 5 percent non-functional specie, and about 5 percent to about 50 percent monofunctional specie; desirably from about 10 percent to about 50 percent difunctional specie, from about 10 percent to about 50 percent non-functional specie, and up to about 50 percent monofunctional specie; and preferably about 25 percent difunctional specie, about 25 percent nonfunctional specie and about 50 percent monofunctional specie. When other ratios of difunctional and non-functional initiators are utilized, it will be appreciated that the end amount of the non-functional terminated polymer as well as the difunctional terminated polymer will generally vary in accordance with the ratio of the difunctional polymer to the non-functional polymer, but that the amount of the monofunctional specie will generally be no higher than 50 percent. However, as noted above, the blend or mixture of the respective statistical monofunctional-terminated polymers desirably each has an average functionality per polymer of approximately 1.

More particularly, the blended product low viscosity statistical monofunctional hydroxy, carboxyl, carboxamide, or imidazole-terminated polymers are respectively made by blending a difunctional hydroxy, carboxyl, carboxamide, or imidazole-terminated polymer with a non-functional polymer.

Difunctional hydroxy, carboxyl, carboxamide or imidazole-terminated reactive liquid polymers which are suitable for use in preparing, respectively, the blended product statistical monofunctional hydroxy, carboxyl, carboxamide, or imidazole-terminated reactive liquid polymers useful as starting materials in the present invention, are prepared in accordance with the processes set forth above, which are hereby fully incorporated by reference.

The non-functional polymers which are blended with the various difunctional-terminated polymers described above to form the blended product statistical monofunctional polymers used as starting materials in the present invention are well known to the art and to the literature.

The selected statistical difunctional and non-functional terminated polymers are brought together and blended in a simple stirrer or mixing device at a temperature of from about 40° C. to about 120° C., desirably from about 50° C. to about 90° C., and preferably from about 50° C. to about 60° C. The amount of difunctional and non-functional polymers present, on a mole basis, may vary from about 0.2 percent to about 90 percent difunctional polymer and from about 10 percent to about 99.8 percent non-functional polymer. Desirably from about 30 percent to about 75 percent difunctional polymer is used and from about 70 percent to about 25 percent non-functional polymer. Preferably from about 60 percent to about 40 percent difunctional polymer and from about 40 percent to about 60 percent non-functional polymer, and most preferably a blend of about 50 percent difunctional polymer and about 50 percent non-functional polymer is used. As noted, one skilled in the art will appreciate that the blended monofunctional polymer product is a mixture of molecules having different end groups, namely a difunctional species and a non-functional species. When the various amounts of difunctional and non-functional polymers are utilized in the mole amounts set forth above, it is expected that, statistically, one obtains an average functionality of from about 0.004 to about 1.8, desirably from about 0.6 to about 1.5, preferably from about 0.8 to about 1.2, and most preferably an average functionality of about 1.0. However, as noted above, the blended product statistical monofunctional terminated polymers each desirably have an average functionality of approximately 1.

The monofunctional-terminated polybutadienes and polyisoprenes produced by the two distinct processes described immediately above have a molecular weight of from about 500 to about 20,000; desirably from about 2,000 to about 10,000; and preferably from about 3,000 to about 5,000.

In accordance with one of the main features of the present invention, the functional groups of the monofunctional or difunctional hydroxy, carboxyl, carboxamide, or imidazole-terminated conjugated diene polymers are blocked by suitable blocking agents in order to prevent deactivation or poisoning of the catalyst used in hydrogenation by those functional groups, thus allowing the hydrogenation of the backbone unsaturation in these polymers to proceed to a substantially high degree. For example, a difunctional hydroxy-terminated polybutadiene polymer is acetylated prior to hydrogenation to prevent the poisoning effect of the functional groups. More specifically, the polymer is reacted with acetic anhydride which blocks the functional hydroxy groups preventing these groups from poisoning the hydrogenation catalyst. After hydrogenating the polymer using hydrogen gas over a conventional homogeneous catalyst such as cobalt, the blocked hydrogenated polymer is subjected to hydrolysis which yields the hydrogenated difunctional hydroxy-terminated polybutadiene polymer. In general, the blocked end groups do not deactivate the catalyst because the blocking agents lack a heteroatomic hydrogen bond such as O—H or N—H as are found in the hydroxy, carboxyl, carboxamide, and imidazole end groups. These reactions can be represented as follows:

with acetic anhydride being preferred. Suitable blocking agent compounds for the functional groups of the monofunctional and difunctional carboxyl-terminated conjugated diene polymers include a tetrahydropyranyl derivative, a methoxyethyl derivative, a trimethylsilyl derivative, or an alkyl ester, with an alkyl ester or a trimethylsilyl ester being preferred. Compounds suitable for use as blocking agents for the functional groups of the monofunctional and difunctional carboxamide-terminated conjugated diene polymers are a N,N-dialkyl derivative or a bistrimethylsilyl derivative, with a bis-trimethylsilyl derivative being preferred. Suitable blocking agents for the functional groups of the monofunctional and difunctional imidazole-terminated conjugated diene polymers include acetic anhydride, a tetrahydropyranyl derivative, a methoxyethyl derivative, or a trimethylsilyl derivative, with a trimethylsilyl derivative being preferred. These blocking agents generally are utilized in at least about an equivalent mole amount

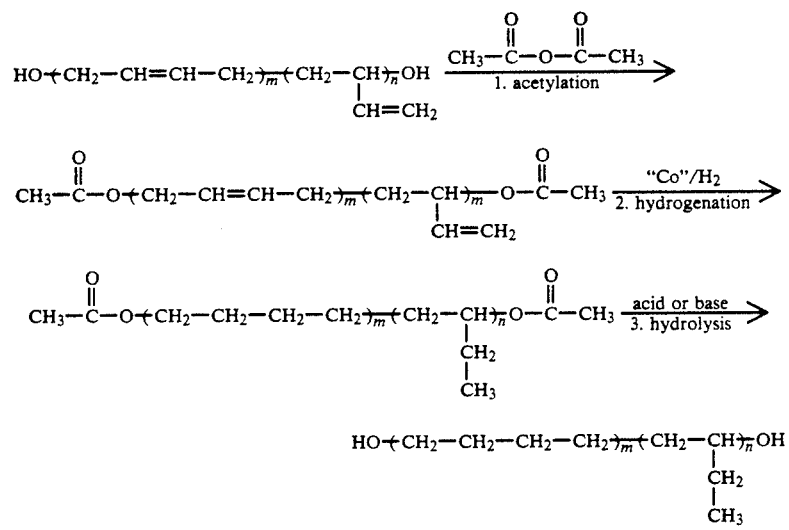

It is understood that the above-described process for producing the hydrogenated difunctional hydroxy-terminated polybutadiene polymer of the present invention, is substantially similar to the process used in producing the hydrogenated difunctional carboxyl, carboxamide, and imidazole-terminated conjugated diene polymers, as well as to the process used in producing the hydrogenated monofunctional hydroxy, carboxyl, carboxamide, and imidazole-terminated conjugated diene polymers. The formation of the hydrogenated difunctional hydroxy-terminated polybutadiene polymer was utilized for illustration purposes as being representative of the processes for forming the other hydrogenated polymers. Specific differences between the manner of forming the various hydrogenated polymers of the present invention are set forth below, together with a more specific description of the respective processes. It is further understood that the type of conjugated diene monomer utilized in forming the backbone of the polymer, that is preferably polybutadiene or polyisoprene, does not affect the manner in which the process of the present invention is carried out.

Compounds suitable for use as blocking agents for the functional groups of the monofunctional and difunctional hydroxy-terminated conjugated diene polymers are acetic anhydride, a tetrahydropyranyl derivative, a methoxyethyl derivative, or a trimethylsilyl derivative, with respect to the functional groups being blocked, desirably in about a 3 to 1 equivalent mole ratio, and preferably in about a 10 to 1 equivalent mole ratio.

The conventional homogeneous hydrogenation catalysts, which can be utilized in the hydrogenation of any of the monofunctional or difunctional hydroxy, carboxyl, carboxamide, or imidazole-terminated conjugated diene polymers set forth above, are derived by the reduction of suitable salts of titanium, iron, cobalt, and nickel. Examples of suitable salts are titanocenedichloride and iron, cobalt and nickel acetylacetonates. Salts of cobalt or nickel that are soluble in organic solvents are preferred. An example of such a preferred salt is cobalt (II) neodecanoate, which is resistant to moisture absorption, and in which the molar ratio of cobalt to the preferred triethylaluminum reductant is about 1:4. Also, the organic groups attached to the metal have no acidic hydrogens. Thus, the common reducing agents, such as trialkylaluminum compounds, used in the formation of the active cobalt species are not consumed by side reactions. Dialkylaluminum chlorides and organolithium or organomagnesium derivatives are other examples of suitable reducing agents for the transition metal salts. The resulting low or zero valent transition metal species may be stabilized by the addition of organic ligands such as hexamethylphosphoric triamide, tetramethylethylenediamine organic phosphines and phosphites, and the like. These conventional homogeneous hydrogenation catalysts are utilized in an amount of about 1 weight percent based on the weight of the polymer being hydrogenated.

Subsequent to hydrogenation, the hydrogenated monofunctional or difunctional-terminated conjugated diene polymer having blocked functional groups then is returned to its original functionality by reacting the polymer with a mineral acid such as hydrochloric acid (HCl) or a mineral base such as sodium hydroxide (NaOH) or potassium hydroxide (KOH). This step is a conventional hydrolysis step as is well known to those having ordinary skill in the art. An excess amount of the mineral acid or base sufficient to achieve hydrolysis is utilized.

The catalyst then can be removed from the monofunctional or difunctional-terminated conjugated diene polymer solution by isolating the polymer. More particularly, the polymer is precipitated from the organic solution by addition to a non-solvent containing one weight percent of a mineral acid such as hydrochloric acid (HCL) based on the total weight of the non-solvent. The catalyst may also be rendered insoluble by suitable additives, as is well known to the art and to the literature. Thus, the catalyst then can be removed by filtration of the solution containing the hydrogenated polymer. Examples of such additives are acetic acid, citric acid, sodium salts of dialkyldithiocarbamates, potassium cyanide, potassium iodide, and the like. These additives are used in an amount of about a molar equivalent amount to the catalyst metal, desirably in a molar ratio of about 5:1, and preferably in a molar ratio of about 10:1.

The hydrogenated monofunctional or difunctional hydroxy, carboxyl, carboxamide, or imidazole-terminated conjugated diene polymer of the present invention is prepared by the following process. Subsequent to formation of the selected starting material monofunctional or difunctional-terminated conjugated diene polymer, the functional end groups of the selected polymer are masked using a suitable one of the above-described blocking agents in a sufficient amount. The blocking step is carried out in an inert atmosphere at standard atmospheric pressure (1 atm), and at a temperature of from about 15° C. to about 150° C., desirably from about 20° C. to about 130° C., and preferably from about room temperature to about 110° C. Optionally, a catalyst base such as a tertiary amine or a Lewis base, or a catalyst acid such as a mineral acid can be utilized in a molar ratio amount of from about 2 to about 10 times that of the functional groups of the base polymer to aid in the blocking process.

The monofunctional or difunctional-terminated oonjuqated diene polymer having blocked functional groups then is subjected to hydrogenation over a selected conventional homogeneous catalyst in a sufficient amount as set forth above at a temperature of from about room temperature up to about 150° C., desirably from about 30° C. to about 70° C., and preferably at about 50° C., and at a pressure of from about 200 to about 1000 psi, desirably from about 400 to about 600 psi, and preferably at about 500 psi.

The hydrogenated monofunctional or difunctional-terminated conjugated diene polymer having blocked functional groups then is hydrolyzed using a selected one of the mineral acids or bases set forth above in an excess amount, in an inert atmosphere at standard atmospheric pressure (1 atm.), and at a temperature of from about 15° C. to about 150° C., desirably from about 20° C. to about 130° C., and preferably from about room temperature to about 110° C.

The catalyst and polymer subsequently are separated and the polymer isolated in a manner well known to those skilled in the art and described briefly above.

In accordance with a key aspect of the present invention, at least about 80 percent of the backbone unsaturation in the selected conjugated diene polymer is removed, desirably at least about 95 percent is saturated, and preferably at least about 99 percent of the backbone of the polymer is saturated for significantly improving the thermooxidative stability of the polymer. At least about 95 percent of the functional groups are returned to their former state by the hydrolysis step described above, and preferably at least about 99 percent.

The invention will be better understood by reference to the following examples. Inasmuch as the process for producing the hydrogenated monofunctional or difunctional conjugated diene polymer of the present invention is similar regardless of whether the polymer backbone is formed from butadiene, isoprene, another diene, or a diene copolymer such as butadiene-styrene, or whether the polymer is monofunctional or difunctional, and further whether the polymer is hydroxy, carboxyl, carboxamide, or imidazole-terminated, the examples set forth below illustrate the process of the present invention for a difunctional hydroxy-terminated polybutadiene.

EXAMPLE 1

Synthesis of a Difunctional Acetoxy-Terminated Poly-butadiene

Under nitrogen, a sample of liquid difunctional hydroxy-terminated polybutadiene (40.0 g, 45 HT available from Atochemicals, Inc.) was dissolved in 40 ml of acetic anhydride. The reaction solution was refluxed overnight. The excess acetic anhydride was then distilled off, with the last traces being removed by vacuum (80° C., 0.1 mm Hg, 4 hr.). The product was a colorless, viscous oil. The infrared spectrum of the product (FIG. 2), when compared with that of the starting material (FIG. 1), indicates the absence of the O—H stretching frequency (3700–3150 cm$^{-1}$) due to the terminal hydroxy groups, and the appearance of a carboxyl stretching frequency at 1740 cm$^{-1}$ due to the terminal acetyl groups. Thus the transformation from formula A to formula BLOCKED-A was accomplished as follows:

$$HO + CH_2 - CH_a = CH_b - CH_2 \overline{)_m} + CH_2 - CH \overline{)_n} OH \xrightarrow[\text{acetylation}]{\begin{matrix} O & O \\ \| & \| \\ CH_3 - C - O - C - CH_3 \end{matrix}}$$

cis or trans $CH_c = C[H_d]_2$ (Formula A)

-continued

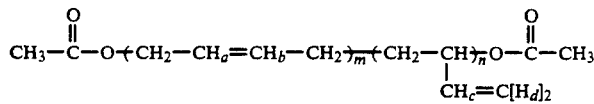

(Formula BLOCKED-A)

EXAMPLE 2

Hydrogenation of the Difunctional Acetoxy-termnated-polybutadiene

Under nitrogen, the difunctional acetoxy-terminated polybutadiene (40.0g) of Example was dissolved in 365 ml of dry cyclohexane (decanted from calcium hydride).

The hydrogenation catalyst was prepared under argon by the dropwise addition of triethylaluminum (27.0 ml, 1M in hexane; available from Aldrich) to a cooled (by ice), stirred (by magnetic bar) solution of cobalt neodecanoate (3.4 g, 12 wt. % Co metal in mineral spirits; available from Mooney). The addition of triethylaluminum caused the evolution of hydrocarbon gases and the purple cobalt solution turned brown immediately. Gas evolution ceased after the addition of approximately half of the triethylaluminum solution. After completion of the addition of triethylaluminum, the catalyst solution was allowed to stir under argon for 15 minutes at room temperature. The catalyst solution was then withdrawn via syringe and injected into the polymer solution prior to its transfer, under nitrogen, into an 845 ml autoclave.

The autoclave was pressurized with hydrogen (500 psi) and rocked at room temperature. The reactor was periodically repressurized to 500 psi in order to compensate for the hydrogen uptake by the polymer. In 1½ hours, a total pressure drop of 500 psi was observed. The temperature of the polymer solution was then raised to 50°-60° C. and the hydrogen pressure increased to 1000 psi. After a pressure drop of 35 psi (ca 3 hr.), no more hydrogen uptake was observed. The autoclave was cooled, hydrogen pressure vented, and glacial acetic acid (100 ml) was added to the solution of the hydrogenated polymer under anaerobic conditions. The autoclave was rocked for I hour before the solution of the hydrogenated polymer was transferred to a sample bottle.

The hydrogenated acetylated polybutadiene compound was isolated as a white waxy solid by coagulation of the polymer solution in acidic methanol (containing 1 wt. percent of concentrated aqueous HCl). The solid was then dried (4 hr., 80° C., air; and 4 hr., 80° C., 0.1 mm Hg).

Analysis of the proton magnetic resonance (hereafter pmr) and infrared spectra of the product established the formation of a highly hydrogenated product as shown below in Formula HYDROGENATED BLOCKED-A:

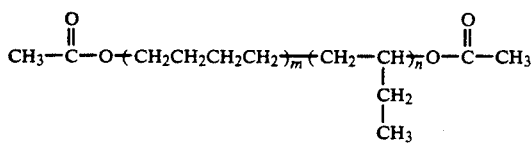

(Formula HYDROGENATED BLOCKED-A)

Figure 3:
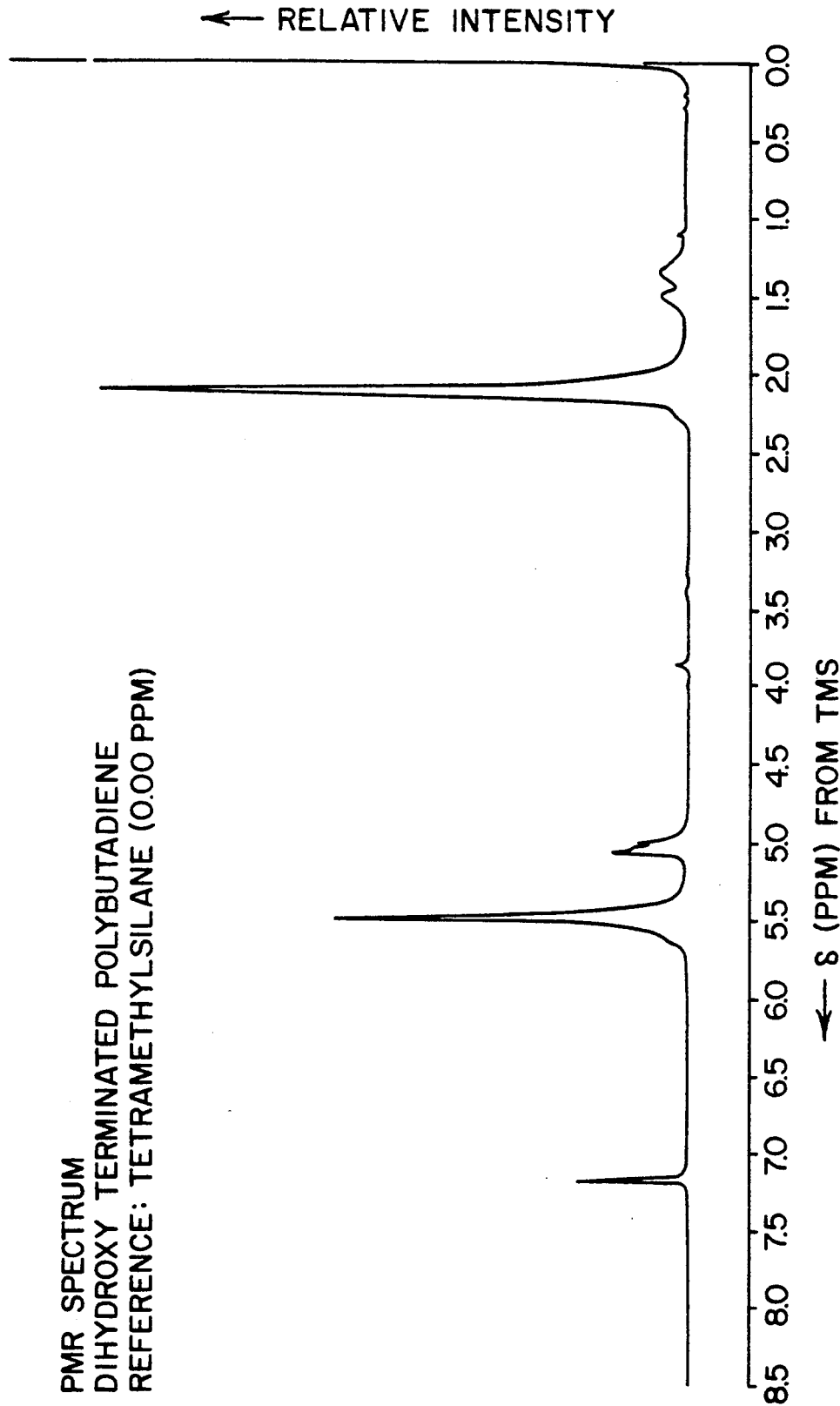
FIG. 3 is a graph of the proton magnetic resonance spectrum of the difunctional hydroxy-terminated butadiene polymer of FIG. I.

Analysis of the pmr spectrum of the difunctional hydroxy-terminated polybutadiene of Formula A, that is:

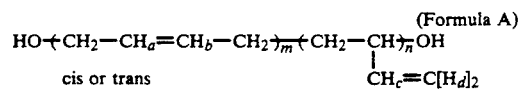

is described below in Table I and shown in FIG. 3.

TABLE I

| Absorption (ppm) | Assignment |
|---|---|
| 0.00 | Reference Signal |
| 1.10–2.36 | Aliphatic Protons |
| 3.85, 4.00 | From terminal —O—CH$_2$— and $\begin{array}{c}H\\|\\-C-OH\\|\end{array}$ units of different polymer microstructures |
| 4.90–5.10 | Protons H$_d$ from the pendent vinyl groups resulting from butadiene polymerized in a 1,2 fashion. |
| 5.20–5.70 | Protons H$_a$, H$_b$ from butadiene polymerized in a 1,4 manner and proton H$_c$ from butadiene polymerized in a 1,2 manner. |
| 7.17 | Residual protons in benzene -d$_6$ (solvent) |

Analysis of the pmr spectrum of the hydrogenated acetylated polybutadiene compound of Formula HYDROGENATED BLOCKED-A, that is:

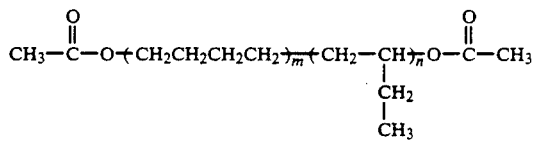

(Formula HYDROGENATED BLOCKED-A)

is set forth below in Table II and illustrated in FIG. 4.

TABLE II

| Absorption (ppm) | Assignment |
|---|---|
| 0.00 | Reference Signal |
| 0.60–0.90 | Methyl protons of pendent ethyl group |
| 0.90–1.80 | Aliphatic Protons |
| 1.98 | $\begin{array}{c}O\\||\\CH_3-C-\end{array}$ protons of end groups |
| 3.90, 4.00 | —O—CH$_2$— and —CH—O— protons of different polymer microstructures |
| 5.35 (trace) | Residual Unsaturation |
| 5.93 | Residual protons in sym. tetrachloroethane d$_2$ (solvent) |

The almost complete absence of protons attached to carbon-carbon unsaturation (4.90–5.70 ppm) in the pmr spectrum of the hydrogenated polymer indicates near 100 percent hydrogenation.

A comparison of the infrared spectra of the difunctional acetoxy-terminated butadiene polymer of Formula BLOCKED-A (FIG. 2) with that of the hydrogenated difunctional acetoxy-terminated butadiene polymer of Formula HYDROGENATED BLOCKED-A (FIG. 5) indicates the complete absence of the bands at 970 and 915 cm$^{-1}$ due to carbon-hydrogen bonds attached to carbon-carbon unsaturation.

Example 3

Hydrolysis of the Hydrogenated Difunctional Acetoxy-Terminated Butadiene Polymer To Form the Hydrogenated Difunctional Hydrosy-Terminated Butadiene Polymer Under nitrogen, the product of Example 2 (2.0 g) was dissolved in cyclohexane (50 ml). Tricaprylmethylammonium chloride (0.2 g) and a solution of sodium hydroxide in methanol (0.5 g of commercial sodium hydroxide pellets were crushed and dissolved in 7.0 ml of methanol) were then added to the cyclohexane solution, which was refluxed for 5 hours.

The cooled reaction solution was extracted thrice with an equal volume of saturated aqueous ammonium chloride, dried (MgSO$_4$), and evaporated to a waxy solid which was dried (80° C., 0.1 mm Hg, 4 hr.). The formed product had the following structural Formula HYDROGENATED A:

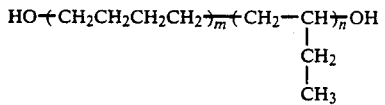

(Formula HYDROGENATED A)

Figure 2:
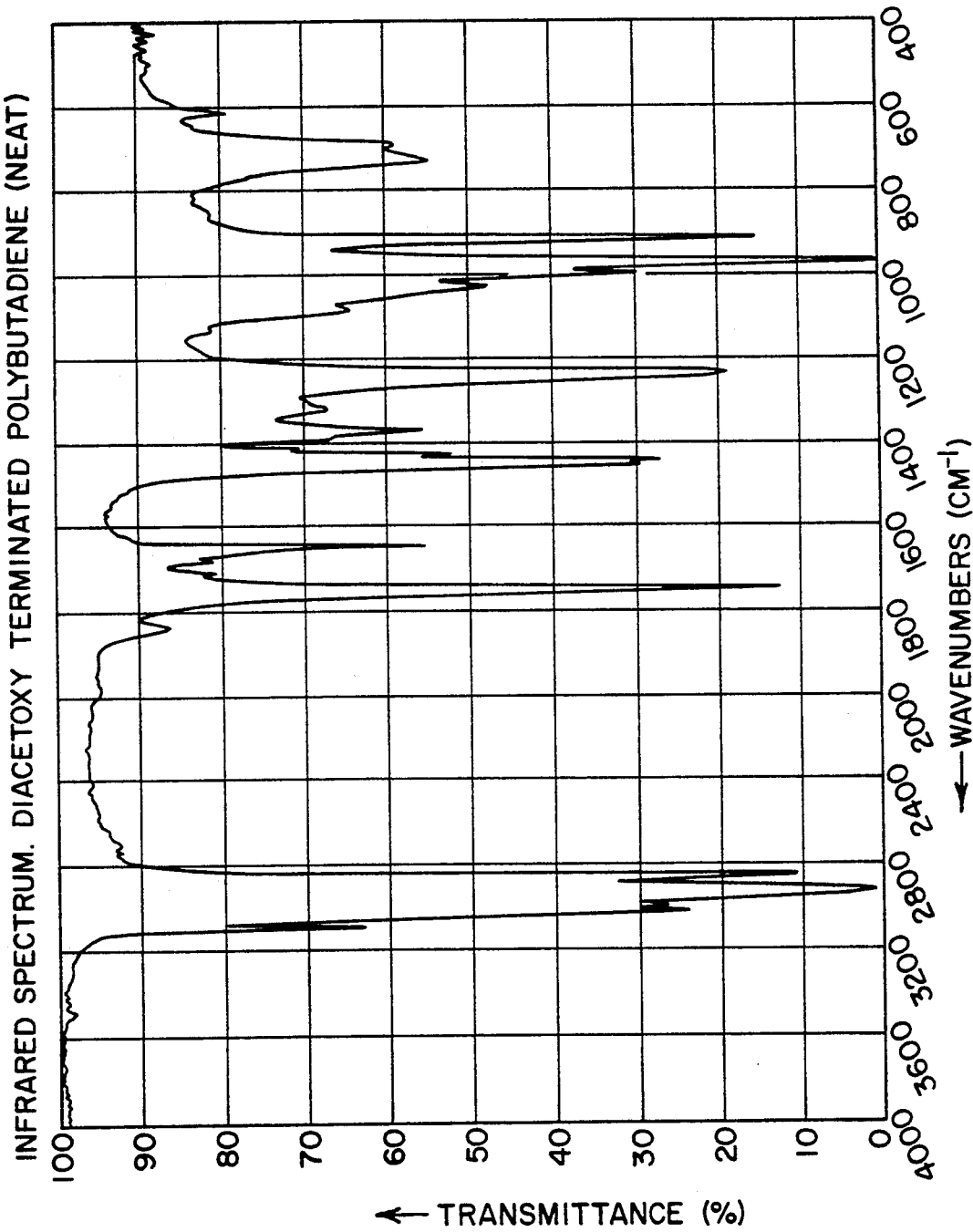
FIG. 2 is a graph of the infrared spectrum for a difunctional acetoxy-terminated butadiene polymer formed by acetylating the polymer of FIG. 1.

The infrared spectrum of the hydrogenated difunctional hydroxy-terminated butadiene polymer product of the present invention (FIG. 6) when compared with that of the hydrogenated difunctional acetoxy-terminated polybutadiene prior to hydrolysis and return of the polymer to its original functionality (FIG. 5) shows the absence of the terminal acetoxy groups (1740 cm$^{-1}$) and the appearance of terminal hydroxy groups (3700-3100 cm$^{-1}$) as in FIG. 1.

EXAMPLE 4

Comparative Example Attempted Hydrogenation of Liquid Difunctional Hydroxy-Terminated polybutadiene Under nitrogen, a sample of liquid difunctional hydroxy-terminated polybutadiene (Formula A) (40.0 g, 45 HT available from Atochemicals, Inc.) was dissolved in 365 ml of dry cyclohexane (decanted from calcium hydride).

A hydrogenation catalyst solution was made up as described in Example 2. Addition of the catalyst solution to the polymer solution caused instantaneous precipitation of the polymer due to chain extension and crosslinking reactions promoted by the aluminum and cobalt compounds of the catalyst, which were "poisoned" or deactivated by the —OH end groups of the polymer. Hence, hydrogenation of the polymer to a high degree could not be accomplished.

The liquid hydrogenated monofunctional and difunctional-terminated conjugated diene polymers of the present invention are useful in the modification of epoxy resin systems to provide improved impact and water resistance to these systems due to the flexible backbone and the hydrocarbon character of the backbone of the conjugated diene monomers, respectively. The improved thermooxidative stability of the modifying polymers of the present invention also translates into superior heat resistance in the epoxy resin systems. The polymers of the present invention also can be used in the synthesis of heat and moisture-resistant polyurethanes and polyesters, which are then suitable in covulcanization with elastomers based on hydrocarbons such as EPDM to improve oil resistance and to improve adhesive properties in those polymers. Further, due to the hydrocarbon segments in the backbone monomers and their relatively non-polar nature, these polymers may be used as a compatibilizer in the blending of polar plastics or elastomers with relatively inexpensive non-polar materials. For example, a polyolefin/polyurethane blend modified with the polymers of the present invention may be suitable for the manufacture of paintable, scratch resistant, high quality surface finish structural parts for automobile and aerospace applications.

While in accordance with the Patent Statutes, the best mode and preferred embodiments have been set forth, the scope of the invention is not limited thereto, but rather by the scope of the attached claims.

What is claimed is:

1. A process for hydrogenating backbone unsaturation of a polymer having functional end groups, each of said functional end groups containing at least one heteroatomic hydrogen bond, said process including the steps of:

a) reacting a sufficient amount of a blocking agent with said functional end groups for blocking the functionality of said end groups, said blocking agent being free of any heteroatomic hydrogen bonds and capable of being hydrolyzed to return said polymer to its original functionality;

b) hydrogenating at least about 80 percent of the backbone unsaturation of said polymer in the presence of a sufficient amount of a noble metal-free homogeneous catalyst, said blocking agent preventing deactivation of said catalyst by said functional end groups; and c) hydrolyzing said hydrogenated polymer with a sufficient amount of a hydrolyzing compound for unblocking said end groups and returning said polymer to its original functionality.

2. The process of claim 1, wherein at least about an equivalent mole amount of said blocking agent is utilized with respect to said functional end groups; wherein said reaction of said blocking agent with said functional end groups is carried out at a temperature of from about 15° C. to about 150° C.; wherein at least about 95 percent of the backbone unsaturation of said polymer is hydrogenated; wherein said noble metal-free homogeneous catalyst is a reduced salt of titanium, iron, cobalt, or nickel; wherein hydrogenation is carried out at a temperature of from about room temperature to about 150° C., and at a pressure of from about 200 psi to about 1,000 psi; wherein an excess amount of said hydrolyzing compound is utilized; and wherein hydrolysis is carried out at a temperature of from about 15° C. to about 150° C.

3. The process of claim 2, wherein the equivalent mole ratio of said blocking agent to said functional end groups is at least about 3:1; wherein said reaction of said blocking agent with said functional end groups is carried out at a temperature of from about 20° C. to about 130° C.; wherein at least about 99 percent of the backbone unsaturation of said polymer is hydrogenated; wherein hydrogenation is carried out at a temperature of from about 30° C. to about 70° C. and at a pressure of from about 400 to about 600 psi; and wherein hydrolysis is carried out at a temperature of from about 20° C. to about 130° C.

4. The process of claim 3, wherein the equivalent mole ratio of said blocking agent to said functional end groups is at least about 10:1; wherein said reaction of said blocking agent with said functional end groups is carried out at a temperature of from about room temperature to about 110° C.; wherein hydrogenation is carried out at a temperature of about 50° C. and at a pressure of about 500 psi; wherein said catalyst is utilized in an amount of about one weight percent based on the weight of said polymer; and wherein hydrolysis is carried out at a temperature of from about room temperature to about 110° C.

5. The process of claim 2, wherein said polymer is a monofunctional or difunctional-terminated conjugated diene polymer or copolymer comprised of substantially non-polar monomers having 4 to 8 carbon atoms; and wherein said polymer has a molecular weight of from about 500 to about 20,000.

6. The process of claim 4, wherein said polymer is a monofunctional or difunctional-terminated conjugated diene polymer or copolymer comprised of substantially non-polar monomers having 4 to 8 carbon atoms; and wherein said polymer has a molecular weight of from about 500 to about 20,000.

7. The process of claim 5, wherein said polymer is a monofunctional or difunctional-terminated butadiene or isoprene homopolymer having a molecular weight of from about 2,000 to about 10,000.

8. The process of claim 6, wherein said polymer is a monofunctional or difunctional-terminated butadiene or isoprene homopolymer having a molecular weight of from about 2,000 to about 10,000.

9. The process of claim 7, wherein said polymer is hydroxy, carboxyl, carboxamide, or imidazole-terminated; and wherein said polymer has a molecular weight of from about 3,000 to about 5,000.

10. The process of claim 8, wherein said polymer is hydroxy, carboxyl, carboxamide, or imidazole-terminated; and wherein said polymer has a molecular weight of from about 3,000 to about 5,000.

11. The process of claim 9, wherein said polymer is hydroxy terminated; wherein said blocking agent is acetic anhydride, a tetrahydropyranyl derivative a methoxyethyl derivative, or a trimethylsilyl derivative; and wherein said hydrolyzing compound is a mineral acid or a mineral base.

12. The process of claim 10, wherein said polymer is hydroxy-terminated; wherein said blocking agent is acetic anhydride, a tetrahydropyranyl derivative, a methoxyethyl derivative, or a trimethylsilyl derivative; and wherein said hydrolyzing compound is a mineral acid or a mineral base.

13. The process of claim 12, wherein said blocking agent is acetic anhydride; wherein said reduced salt catalyst is cobalt (II) neodecanoate/triethylaluminum in which the molar ratio of cobalt to aluminum is about 1:4; and wherein said mineral acid is hydrochloric acid and said mineral base is potassium hydroxide or sodium hydroxide.

14. The process of claim 9, wherein said polymer is carboxyl-terminated; wherein said blocking agent is a tetrahydropyranyl derivative, a methoxyethyl derivative, a trimethylsilyl derivative, or an alkyl ester; and wherein said hydrolyzing compound is a mineral acid or a mineral base.

15. The process of claim 10, wherein said polymer is carboxyl-terminated; wherein said blocking agent is a tetrahydropyranyl derivative, a methoxyethyl derivative, a trimethylsilyl derivative, or an alkyl ester; and wherein said hydrolyzing compound is a mineral acid or a mineral base.

16. The process of claim 15, wherein said blocking agent is said alkyl ester or a trimethylsilyl ester; wherein said reduced salt catalyst is cobalt (II) neodecanoate/triethylaluminum in which the molar ratio of cobalt to aluminum is about 1:4; and wherein said mineral acid is hydrochloric acid and said mineral base is potassium hydroxide or sodium hydroxide.

17. The process of claim 9, wherein said polymer is carboxamide-terminated; wherein said blocking agent is a N,N-dialkyl derivative or a bis-trimethylsilyl derivative; and wherein said hydrolyzing compound is a mineral acid or a mineral base.

18. The process of claim 10, wherein said polymer is carboxamide-terminated; wherein said blocking agent is a N,N-dialkyl derivative or a bis-trimethylsilyl derivative; and wherein said hydrolyzing compound is a mineral acid or a mineral base.

19. The process of claim 18, wherein said blocking agent is said bis-trimethylsilyl derivative; wherein said reduced salt catalyst is cobalt (II) neodecanoate/triethylaluminum in which the molar ratio of cobalt to aluminum is about 1:4; and wherein said mineral acid is hydrochloric acid and said mineral base is potassium hydroxide or sodium hydroxide.

20. The process of claim 9, wherein said polymer is imidazole-terminated; wherein said blocking agent is acetic anhydride, a tetrahydropyranyl derivative, a methoxyethyl derivative, or a trimethylsilyl derivative; and wherein said hydrolyzing compound is a mineral acid or a mineral base.

21. The process of claim 10, wherein said polymer is imidazole-terminated; wherein said blocking agent is acetic anhydride, a tetrahydropyranyl derivative, a methoxyethyl derivative, or a trimethylsilyl derivative; wherein said reduced salt catalyst is cobalt (II) neodecanoate/triethylaluminum in which the molar ratio of cobalt to aluminum is about 1:4; and wherein said hydrolyzing compound is a mineral acid or a mineral base.

22. The process of claim 21, wherein said blocking agent is said trimethylsilyl derivative; and wherein said mineral acid is hydrochloric acid and said mineral base is potassium hydroxide or sodium hydroxide.

23. A process for forming a polymer having functional end groups and a backbone saturated to at least about 80 percent, each of said functional end groups containing at least one heteroatomic hydrogen bond, said process including the steps of:
   a) reacting a sufficient amount of a blocking agent and the functional end groups of the polymer, said backbone of said polymer being in an unsaturated state during said reaction, said blocking agent being free of any heteroatomic hydrogen bonds and capable of being hydrolyzed to return said polymer to its original functionality;

b) hydrogenating said blocked and unsaturated polymer in the presence of a sufficient amount of a noble metal-free homogeneous catalyst for saturating its backbone, said catalyst being protected by said blocking agent from deactivation by said functional end groups; and c) hydrolyzing said blocked and saturated polymer with a sufficient amount of a hydrolyzing compound for unblocking said end groups and returning said hydrogenated polymer to its original functionality.

24. The process of claim 23, wherein at least about an equivalent mole amount of said blocking agent is utilized with respect to said functional end groups; wherein said reaction of said blocking agent with said functional end groups is carried out at a temperature of from about 15° C. to about 150° C.; wherein at least about 95 percent of the backbone unsaturation of said polymer is hydrogenated; wherein hydrogenation is carried out at a temperature of from about room temperature to about 150° C., and at a pressure of from about 200 psi to about 1,000 psi; wherein an excess amount of said hydrolyzing compound is utilized; wherein hydrolysis is carried out at a temperature of from about 15° C. to about 150° C.; wherein said polymer is a monofunctional or difunctional-terminated conjugated diene polymer or copolymer comprised of substantially non-polar monomers having 4 to 8 carbon atoms; and wherein said polymer has a molecular weight of from about 500 to about 20,000.

25. The process of claim 24, wherein the equivalent mole ratio of said blocking agent to said functional end groups is at least about 3:1; wherein said reaction of said blocking agent with said functional end groups is carried out at a temperature of from about 20° C. to about 130° C.; wherein at least about 99 percent of the backbone unsaturation of said polymer is hydrogenated; wherein hydrogenation is carried out at a temperature of from about 30° C. to about 70° C. and at a pressure of from about 400 to about 600 psi; wherein hydrolysis is carried out at a temperature of from about 20° C. to about 130° C.; and wherein said polymer is a monofunctional or difunctional-terminated butadiene or isoprene homopolymer having a molecular weight of from about 2,000 to about 10,000.

26. The process of claim 25, wherein the equivalent mole ratio of said blocking agent to said functional end groups is at least about 10:1; wherein said reaction of said blocking agent with said functional end groups is carried out at a temperature of from about room temperature to about 110° C.; wherein said noble metal-free homogeneous catalyst is a reduced salt of titanium, iron, cobalt, or nickel, and is utilized in an amount of about one weight percent based on the weight of said polymer; wherein hydrogenation is carried out at a temperature of about 50° C. and at a pressure of about 500 psi; wherein hydrolysis is carried out at a temperature of from about room temperature to about 110° C.; wherein said polymer is hydroxy, carboxyl, carboxamide, or imidazole-terminated; and wherein said polymer has a molecular weight of from about 3,000 to about 5,000;

27. The process of claim 24, wherein said polymer is hydroxy terminated; wherein said blocking agent is acetic anhydride, a tetrahydropyranyl derivative, a methoxyethyl derivative, or a trimethylsilyl derivative; and wherein said hydrolyzing compound is a mineral acid or a mineral base.

28. The process of claim 26, wherein said blocking agent is acetic anhydride; wherein said reduced salt catalyst is cobalt (II) neodecanoate/triethylaluminum in which the molar ratio of cobalt to aluminum is about 1:4; and wherein said hydrolyzing compound is hydrochloric acid, potassium hydroxide or sodium hydroxide.

29. The process of claim 25, wherein said polymer is carboxyl-terminated; wherein said blocking agent is a tetrahydropyranyl derivative, a methoxyethyl derivative, an alkyl ester, or a trimethylsilyl derivative; and wherein said hydrolyzing compound is a mineral acid or a mineral base.

30. The process of claim 26, wherein said blocking agent is said alkyl ester or a trimethylsilyl ester; wherein said reduced salt catalyst is cobalt (II) neodecanoate/triethylaluminum in which the molar ratio of cobalt to aluminum is about 1:4; and wherein said hydrolyzing compound is hydrochloric acid, potassium hydroxide or sodium hydroxide.

31. The process of claim 24, wherein said polymer is carboxamide-terminated; wherein said blocking agent is a N,N-dialkyl derivative or a bis-trimethylsilyl derivative; and wherein said hydrolyzing compound is a mineral acid or a mineral base.

32. The process of claim 26, wherein said blocking agent is said bis-trimethylsilyl derivative; wherein said reduced salt catalyst is cobalt (II) neodecanoate/triethylaluminum in which the molar ratio of cobalt to aluminum is about 1:4; and wherein said hydrolyzing compound is hydrochloric acid, potassium hydroxide or sodium hydroxide.

33. The process of claim 25, wherein said polymer is imidazole-terminated; wherein said blocking agent is acetic anhydride, a tetrahydropyranyl derivative, a methoxyethyl derivative, or a trimethylsilyl derivative; and wherein said hydrolyzing compound is a mineral acid or a mineral base.

34. The process of claim 26, wherein said blocking agent is said trimethylsilyl derivative; wherein said reduced salt catalyst is cobalt (II) neodecanoate/ triethylaluminum in which the molar ratio of cobalt to aluminum is about 1:4; and wherein said hydrolyzing compound is hydrochloric acid, potassium hydroxide or sodium hydroxide.

* * * * *